Patented Aug. 30, 1932

1,875,005

UNITED STATES PATENT OFFICE

ROBERT T. HUCKS, OF PARLIN, NEW JERSEY, ASSIGNOR TO E. I. DU PONT DE NEMOURS & COMPANY, OF WILMINGTON, DELAWARE, A CORPORATION OF DELAWARE

COATING MATERIAL AND PROCESSES OF PREPARING SAME

No Drawing. Application filed October 15, 1927. Serial No. 226,527.

This invention relates to coating materials such as lacquers and enamels, and processes of preparing same.

In preparing pigmented lacquers or enamels, many of the pigments which are used are precipitated by means of water solutions of suitable compounds. After precipitation, the pigment is separated from the aqueous liquid by means of filtration, usually in a filter-press. The filter-press cake (technically known as pulp) usually contains about 25–75% water and about 75–25% pigment. The commercial pigments are prepared by drying the filter-press cakes and grinding and sifting the dry material. In the drying process many of the small particles of pigment become cemented together forming aggregates which are broken up with difficulty. The grinding and sifting steps break up these aggregates to a certain extent, but since the meshes of even the finest sieves are coarse as compared with the original size of the individual particles, it is impossible to obtain the pigment in as fine a state of subdivision as was the case before drying the pulp. Furthermore, the grinding and sifting operations cause the pigment particles to adsorb a layer of air and this adsorbed gas is responsible for further difficulty when the pigment is subsequently dispersed in a paint, varnish or lacquer vehicle. In the drying process the pigments also undergo undesirable color changes.

The dry pigments prepared as described are ordinarily dispersed in the vehicle and other enamel ingredients by grinding them together in suitable mechanical mills or the like. While some of the mechanical devices, such as buhr stone mills, roller mills or pebble mills, are valuable in breaking up the aggregates and in driving some of the air from the surface of the particles, the successful operation of such devices consumes a large amount of energy with the development of sufficient heat to greatly injure the color of many of the pigments and as a result the enamels containing such pigments are dirty and require special tinting. The drying, grinding, sifting and dispersion operations are costly and entail the expenditure of considerable time in carrying out the process.

It is one of the objects of this invention to prepare a pigmented lacquer or enamel by dispersing the pigment pulp in pyroxylin colloid or solution without necessitating preliminary drying, grinding or sifting of the pigment prior to the dispersion thereof in the vehicle. It is a further object to disperse the pigment in the vehicle, while retaining the original pigment particle size and obtaining a superior coating composition characterized by its brilliance of color. It is a still further object to prepare compositions in which the original tinting strength of the pigment is more uniformly maintained in the enamel. Other objects will be apparent from the description.

The above objects are attained and the prior art difficulties overcome by the present invention which comprises mixing in a suitable manner, the pigment pulp or filter-press cake with a suitable colloided nitrocellulose, in the presence of a substance miscible with the nitrocellulose but which substance is immiscible with water, thereby causing the water to separate from the mixture in such a manner as to be easily removed.

As a specific example, given merely by way of illustration and not in limitation, the following represents one method of carrying out the invention:

A pyroxlyn colloid plastic is prepared by mixing fibrous pyroxylin with dibutyl phthalate. A specific composition may contain pyroxylin 60%, dibutyl phthalate 14% and alcohol 26%, all by weight. One hundred pounds of moist filter-press cake, or pulp, consisting of approximately 50% chrome green and 50% water are mixed intimately with 100 pounds of the colloided nitrocellulose plastic corresponding with the above formula. Prior to, or during mixing, it is preferable to add a small amount of an active pyroxylin solvent, which solvent is also a water repellent and hastens the separation of the water. Examples of such solvents are butyl acetate, ethyl acetate, amyl acetate, Pentasol acetate, Cellosolve acetate, etc. The pigment is preferably added in several portions to the mixture while it is being kneaded, stirred or agitated in any suitable manner or apparatus until the incorporation of pigment is complete and the water is separated. Complete separation usually takes place in about thirty minutes. The separated water is then poured off or removed from the pigmented colloid in any convenient manner.

The mixture of plastic and pigment is used in the preparation of a pyroxylin enamel or lacquer by mixing it with proper solvents, resins, etc., in the usual manner and according to the usual compositions of such products.

The enamels prepared according to the present process are much more brilliant, cleaner in color and show far greater depth and far better gloss than the enamels prepared from the dried and ground pigments. Furthermore, the enamels are characterized by the uniform tinting strength of the pigments and by freedom from pigment grit. The process is cheaper than the usual methods, involving a short manufacturing cycle and giving high yields. The enamels of the present invention may contain one to two percent of water in the finished product but this does not have any detrimental effect.

The process is capable of many changes and variations in respect to its details. The nitrocellulose may be either fibrous nitrocellulose, smokeless powder, or other previously gelatinated nitrocellulose, and having any desired viscosity characteristics. In preparing a pyroxylin colloid plastic from smokeless powder, this material is swollen by refluxing the same in a kettle with alcohol and with or without butyl acetate until the powder grains become swollen and may be easily pulverized between the fingers. It is then used in the same manner as fibrous nitrocellulose. In place of the butyl phthalate used as a colloiding agent and water repellent, there may be used any suitable substance or mixture of substances having the desired properties of colloiding nitrocellulose and at the same time being immiscible with water to such an extent that the water in the pulp pigment will separate or be repelled by the colloiding agent. Among the colloiding agents which may be used in the present process may be mentioned camphor, camphor oil and suitable blown oils which are compatible with the pyroxylin. If desired, suitable mixtures may be employed. Ordinarily, without the use of the colloiding agent in the process described, the contacting of water with pyroxylin solutions causes the pyroxylin to precipitate out in a heavy unworkable mass.

In carrying out the process nitrocellulose in any suitable form and having the desired characteristics is colloided with the desired colloiding agent or agents. This colloided material is usually in the nature of a flexible, rubbery solid. The pulp pigment, when kneaded together with the pyroxylin colloid forms a putty with the colloid, the water separating therefrom.

The process is applicable to the incorporation of practically any of the wet pulp pigments into pyroxylin. The following illustrate a few of the pigments which have been found suitable:—

Lead chromate yellows,
Basic chromate oranges,
Iron ferrocyanide blues (Prussian blue, Chinese blue, etc.),
Toners (para, maroon, toluidine, etc.),
Lithopone and other sulfide pigments,
Chrome green pigments,
Lakes (maroon, black, etc.),
Ultramarine blue,
Titanium pigments.

As falling within the present invention, there may be included certain pigments which ordinarily are not precipitated in the form of a pulp, but which pigments may be wet with water and incorporating into a pyroxylin plastic in the same manner as is done with the pulp pigments. This method of incorporation is much simpler than the usual methods and eliminates the somewhat undesirable step of grinding the composition to obtain the desired dispersion of pigment in vehicle. As specific examples of this class of pigments may be mentioned zinc oxide, carbon black, etc.

In some cases where the pigments display an acidic character in their surface films, this acidity prevents complete wetting by the colloid and prevents the desired elimination of water. Enamels made with these pigments by the present process may contain about 4 to 6% water, and, while these enamels spray successfully and have desirable durability, they have some minor disadvantages from a commercial standpoint. These pulp pigments referred to may be dispersed in the nitrocellulose colloid to obtain enamels of much lower water content by the adoption of several expedients. If, for instance, a suitable alkaline substance is added while the pigment is being mixed with the pyroxylin, efficient water separation will be obtained. For this purpose there may be used caustic alkalies, zinc oxide, calcium carbonate, magnesium carbonate, aluminum hydroxide, etc. Another way in which the acidic pulp pigments may be successfully dispersed with pyroxylin colloid and dehydrated is by further processing the pigmented colloid, as by rolling this mixture into thin sheets on suitable rolls, carrying out part of the mixing operation, if desired, in a vacuum mixer. Examples of pigments falling in the acidic class are the iron blue pigments, dark chrome green pigments and black lake pigments.

The present invention is capable of wide variations, as to the materials used, the proportions in which they are used, as well as in the details of the process. Any suitable changes and variations may be made without departing from the spirit and scope of the invention.

I claim:

1. The method of making a coating composition which comprises mixing a water wet pigment with a substantially non-aqueous cellulose compound containing a water repellant substance until the water carried by the pigment separates from the composition, and then removing the separated water.

2. The method of claim 1 in which the water repellant substance is a solvent for the cellulose compound.

3. The method of claim 1 in which the water repellant substance is a colloiding agent for the cellulose compound.

4. The method of claim 1 in which the water repellant substance is dibutyl phthalate.

5. The method of making a coating composition which comprises mixing a water wet pigment with a substantially non-aqueous cellulose compound coating composition containing an ingredient which is to form part of the coating and which is water repellant, continuing said mixing until the water carried by the pigment separates from the composition, and then removing the separated water.

6. The method of claim 5 in which the mixture is kneaded.

7. The method of making a coating composition which comprises mixing a water wet pigment with a non-aqueous cellulose compound coating composition containing an ingredient which is water repellant, in kneading the mixture, and in hastening the separation of water from the mixture by the addition of a small amount of a water repellant pyroxylin solvent.

8. The method of making a coating composition containing a water wet pigment of the type prepared by precipitation from an aqueous solution which comprises adding the pigment substantially directly from the precipitating bath to a substantially non-aqueous coating composition containing a cellulose compound and a water repellant substance, kneading the composition until the water carried by the pigment separates from the composition, and then removing the separated water.

9. The method set forth in claim 8 in which the water repellant substance is dibutyl phthalate.

10. The method set forth in claim 8 in which the water repellant substance is a colloiding agent for the cellulose compound.

11. The method of making a pigmented coating composition comprising mixing a cellulose compound with a water repellant substance, mixing therewith a water wet pigment, until the water carried by the pigment separates from the composition, and then removing the separated water.

12. The method set forth in claim 11 in which the water-repellant substance is a colloiding agent for the cellulose compound.

13. The method set forth in claim 11 in which the water repellant substance is dibutyl phthalate.

In testimony whereof, I affix my signature.

ROBERT T. HUCKS.